US008023624B2

(12) United States Patent
Kargman et al.

(10) Patent No.: US 8,023,624 B2
(45) Date of Patent: Sep. 20, 2011

(54) SERVICE INTERFACING FOR TELEPHONY

(75) Inventors: Harry B. Kargman, New York, NY (US); Joshua A. Strickon, New York, NY (US)

(73) Assignee: ACK Ventures Holdings, LLC, New York, NY (US)

( * ) Notice: Subject to any disclaimer, the term of this patent is extended or adjusted under 35 U.S.C. 154(b) by 1374 days.

(21) Appl. No.: 11/268,422

(22) Filed: Nov. 7, 2005

(65) Prior Publication Data

US 2007/0116236 A1    May 24, 2007

(51) Int. Cl.
    *H04M 1/64* (2006.01)
(52) U.S. Cl. .................... 379/88.17; 379/88.13
(58) Field of Classification Search .......... 704/270, 704/270.1; 379/142.01, 142.04, 142.06, 379/142.05, 67.1, 88.11, 88.13, 88.19, 88.2, 379/88.22, 88.23, 88.24, 207.11
    See application file for complete search history.

(56) References Cited

U.S. PATENT DOCUMENTS

| | | | | |
|---|---|---|---|---|
| 4,994,797 | A * | 2/1991 | Breeden | 340/7.28 |
| 5,884,262 | A * | 3/1999 | Wise et al. | 704/270.1 |
| 5,915,001 | A * | 6/1999 | Uppaluru | 379/88.22 |
| 6,157,705 | A | 12/2000 | Perrone | |
| 6,169,911 | B1 * | 1/2001 | Wagner et al. | 455/566 |
| 6,269,336 | B1 * | 7/2001 | Ladd et al. | 704/270 |
| 6,718,015 | B1 * | 4/2004 | Berstis | 379/88.17 |
| 6,804,333 | B1 * | 10/2004 | Liu et al. | 379/88.17 |
| 6,829,334 | B1 * | 12/2004 | Zirngibl et al. | 379/88.17 |
| 6,888,930 | B1 * | 5/2005 | Hartselle et al. | 379/88.22 |
| 6,920,425 | B1 | 7/2005 | Will et al. | |
| 6,987,841 | B1 * | 1/2006 | Byers et al. | 379/88.17 |
| 7,031,699 | B1 * | 4/2006 | Andersen | 455/419 |

(Continued)

FOREIGN PATENT DOCUMENTS

JP      2004297595      10/2004

(Continued)

OTHER PUBLICATIONS

International Search Report for international application No. PCT/US 06/43233 dated Aug. 28, 2007.

(Continued)

*Primary Examiner* — Olisa Anwah
(74) *Attorney, Agent, or Firm* — Fish & Richardson P.C.

(57) ABSTRACT

During a telephone call between a telephone user and an interactive response system, the user is enabled to use only his voice and key presses on a numeric keypad of his telephone to interactively specify information that can be used to control delivery of content to a visual display of, or a storage medium accessible by, a target telephone which may be a land-line phone, a mobile phone, or some other device acting as a telecommunications device. The target telephone has a visual display or a memory to display or store the delivered content, which may include ringtones, text messages, games, wallpapers, ring-back tones, video clips, web pages, applications, or links to information. The user is enabled to engage in an interaction with the response system that is representative of an interaction between the user and a server connected to the Internet. On behalf of the user, a separate interaction is conducted with the server through the Internet based on the representative interaction. Information is received that can be used to identify the user and the target device. Based on the received information, user authentication information is transmitted to the user, the authentication information is received from the user, and the user is allowed to access a service.

79 Claims, 4 Drawing Sheets

U.S. PATENT DOCUMENTS

| | | | |
|---|---|---|---|
| 7,046,777 B2 * | 5/2006 | Colson et al. | 379/142.06 |
| 7,286,653 B2 * | 10/2007 | Hartselle et al. | 379/88.23 |
| 7,409,208 B1 * | 8/2008 | Clare et al. | 455/419 |
| 7,496,355 B2 * | 2/2009 | Nielsen et al. | 455/414.2 |
| 7,522,912 B2 * | 4/2009 | Seo et al. | 455/414.1 |
| 7,647,076 B1 * | 1/2010 | Lavine et al. | 455/566 |
| 2004/0019476 A1 * | 1/2004 | Glynn | 704/1 |
| 2004/0128136 A1 * | 7/2004 | Irani | 704/270.1 |
| 2005/0036593 A1 * | 2/2005 | Zirngibl et al. | 379/88.17 |
| 2005/0100142 A1 * | 5/2005 | Gandhi et al. | 379/88.01 |
| 2006/0199575 A1 * | 9/2006 | Moore et al. | 455/418 |
| 2009/0185669 A1 * | 7/2009 | Zitnik et al. | 379/217.01 |
| 2011/0064208 A1 | 3/2011 | Kargman et al. | |

FOREIGN PATENT DOCUMENTS

| | | |
|---|---|---|
| WO | WO 03/019905 | 3/2003 |

OTHER PUBLICATIONS

International Preliminary Report on Patentability for App. Ser. No. PCT/US06/43233, dated May 7, 2008, 6 pages.

Australian Office Action for App. Ser. No. 2006311709, dated Oct. 27, 2010, 2 pages.

Chinese Office Action for App. Ser. No. 200680049898.5, dated Nov. 10, 2010, 3 pages.

Supplementary European Search Report for App. Ser. No. Ep 06 82 7580, dated May 31, 2011, 5 pages.

Application, pending claims for U.S. Appl. No. 12/953,596, filed Nov. 24, 2010.

Russian Office Action for App. Ser. No. 2008122924/09, dated Jan. 16, 2011, 4 pages.

* cited by examiner

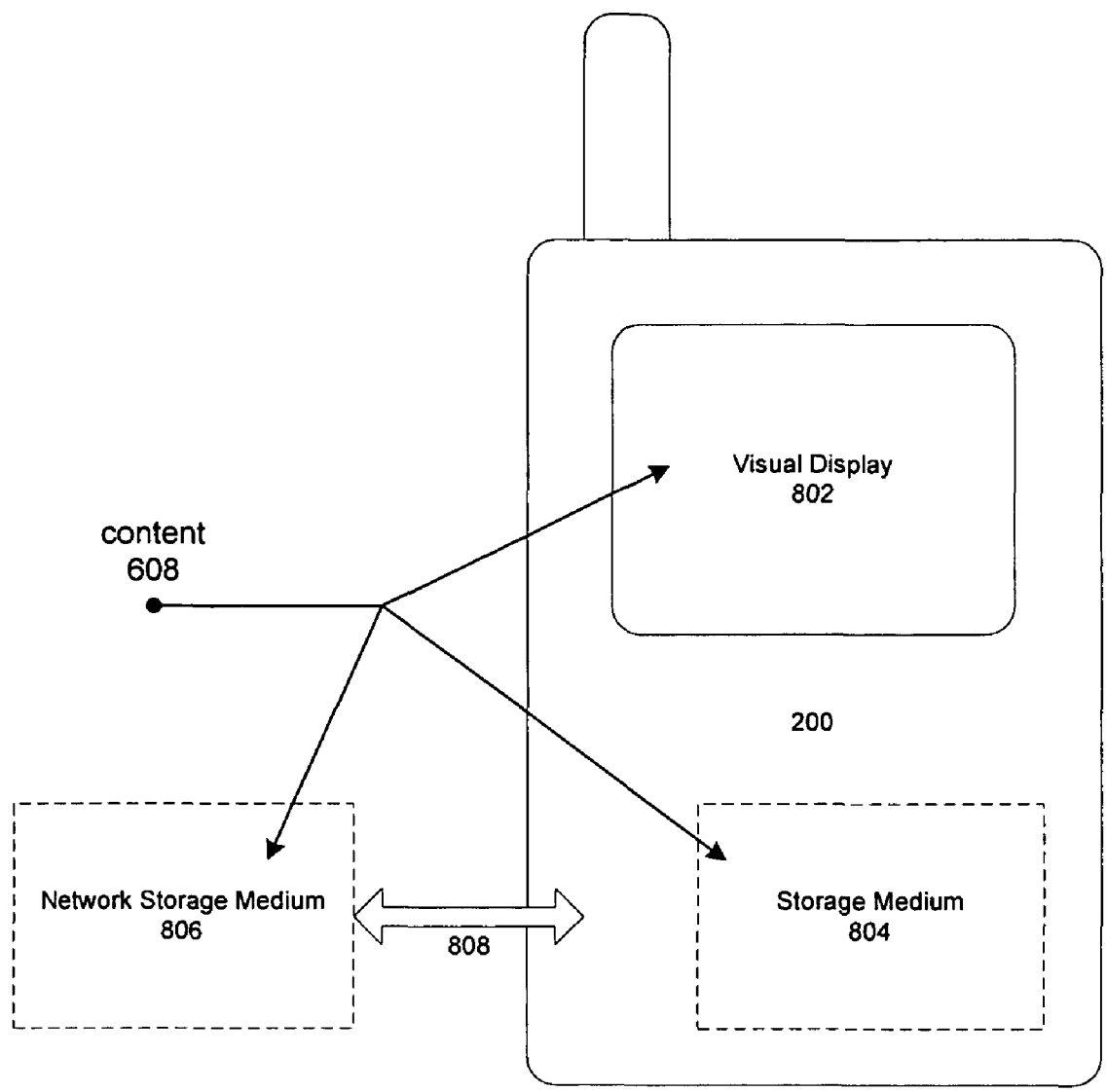

SERVICE INTERFACING FOR TELEPHONY

TECHNICAL FIELD

This invention relates to service interfacing for telephony.

BACKGROUND

Cell phone users, for example, can not only conduct the usual voice phone calls but also have access to a wide variety of additional facilities based on digital data carrying services provided by mobile phone carriers. Cell phones users can, for example, transmit text messages to one another, send and receive email using the Internet, and browse the World Wide Web either through proprietary interfaces or direct access to Internet servers. One use of these services is to download content such as ringtones and video games. In the word "content" we include images, text messages, video material, sounds, audio material, programs, and web pages. Sounds may include ringtones, which play when a user receives a call, and ring-back tones, which are played to a caller to inform them of the recipient's phone is ringing. Another use is to subscribe to services that automatically transmit content to a user periodically. Although user devices designed specifically to take advantage of such functions sometimes include larger screens than hand-held devices, standard QWERTY-layout keyboards, and faster-than-normal data connection capabilities, cell phones with small screens and numeric keypads are also capable of accessing these data services.

Integrated Voice Response (IVR) systems enable users of telephone or other voice-based communications technologies to interact with databases and other information resources using their voices and touch-tone signals generated by their phones. In telephone banking, for example, a bank account holder may access his accounts by speaking his account number and other identifying information or by entering numbers on his phone's keypad. The IVR not only provides an interface for user interaction, but also acts as an intermediary by interpreting the user's speech or touch-tones generated by his phone, relaying the entered information to the bank's computer systems, and converting the bank's response into speech that the user can understand over the phone.

SUMMARY

In general, in one aspect, during a telephone call between a telephone user and an interactive response system, a user is enabled to use only his voice and key presses on a numeric keypad of his telephone to interactively specify information that can be used to control delivery of content to a visual display of, or a storage medium available to, a target telephone.

Implementations may include one or more of the following features. The user's telephone may include a land-line telephone, a mobile phone, a mobile computer, or another device acting in the capacity of a telecommunications device. The target telephone may include the user's telephone, the user's mobile phone or other device, or the telephone of someone other than the user. The interactive response system may include an IVR system. The content may include a ringtone, a text message, a game, wallpaper, a video clip, a ring-back tone, an application, a web page, or a link to information. The content may be delivered by a supplier of content. The supplier of content may be independent of the interactive response system. The information specified by the user may include an identification of the content. The information specified by the user may include billing information. There may also be communication with a service provider with respect to delivery of the content based on the information specified by the user. There may be interaction with a service provider to cause the content to be delivered. The service provider may be independent of the interactive response system. Information provided in connection with the telephone call may be used to manage a user account associated with the user. Information may be automatically obtained during the telephone call that identifies the user, and the information identifying the user may be used to instruct a third party to bill the user for the content. The third party may provide telephone services to the user.

In general, in one aspect, during a telephone call between a telephone user and an interactive response system, the user is enabled to engage in an interaction with the response system that is representative of an interaction between the user and a server connected to the Internet, and, on behalf of the user, a separate interaction is conducted with the server through the Internet based on the representative interaction.

Implementations may include one or more of the following features. The telephone call may be conducted on a bandwidth-limited channel and the separate interaction through the Internet may be conducted on a higher-bandwidth channel. At least part of the telephone call and part of the separate interaction through the Internet may occur at the same time. At least part of the telephone call and part of the separate interaction through the Internet may occur at different times. The server may be independent of the interactive response system. Information may be automatically obtained during the telephone call that identifies the user, and that information may be used to identify the user to the server.

In general, in one aspect, during a telephone call between a telephone user and an interactive response system, the user is enabled to use only his voice and key presses on a numeric keypad of his telephone to interactively specify information that can be used to control delivery transaction, information is automatically obtained during the telephone call that identifies the user, and the information is used to facilitate the transaction.

Implementations may include one or more of the following features. The information that identifies the user may include a caller ID, a subscriber ID, or a handle. An account of the user may be managed based on the automatically obtained information and the information specified by the user.

In general, in one aspect, during a telephone call between a telephone user and an interactive response system, information is received that can be used to identify the user, based on the received information, user authentication information is transmitted to the user, the authentication information is received from the user, and the user is allowed to access a service.

Among the advantages of the invention are one or more of the following. Users of cellular or land-line telephones that do not have data capabilities, or who do not wish to or cannot use whatever data capabilities their phones have, can use services intended for users who can and do use phones with data capabilities. Users of phones that do have data capabilities can use these services in a simplified manner. They can use these services by dialing their telephones in a manner to which they are accustomed for making telephone calls. The interactive voice response system may have a faster connection to a network such as the Internet than the user's telephone or other device has, and, by relaying information between a user and servers on the Internet, it may allow the user to access information from servers faster or more conveniently than they could if they were directly communicating with those servers using their device's data capabilities.

Other general aspects include other combinations of the aspects and features described above and other aspects and features expressed as methods, apparatus, systems, program products, and in other ways.

Other advantages and features will become apparent from the following description and claims.

DESCRIPTION OF DRAWINGS

FIG. 8 shows a mobile telephone device.

Like reference symbols in the various drawings indicate like elements.

DETAILED DESCRIPTION

Figure 1:
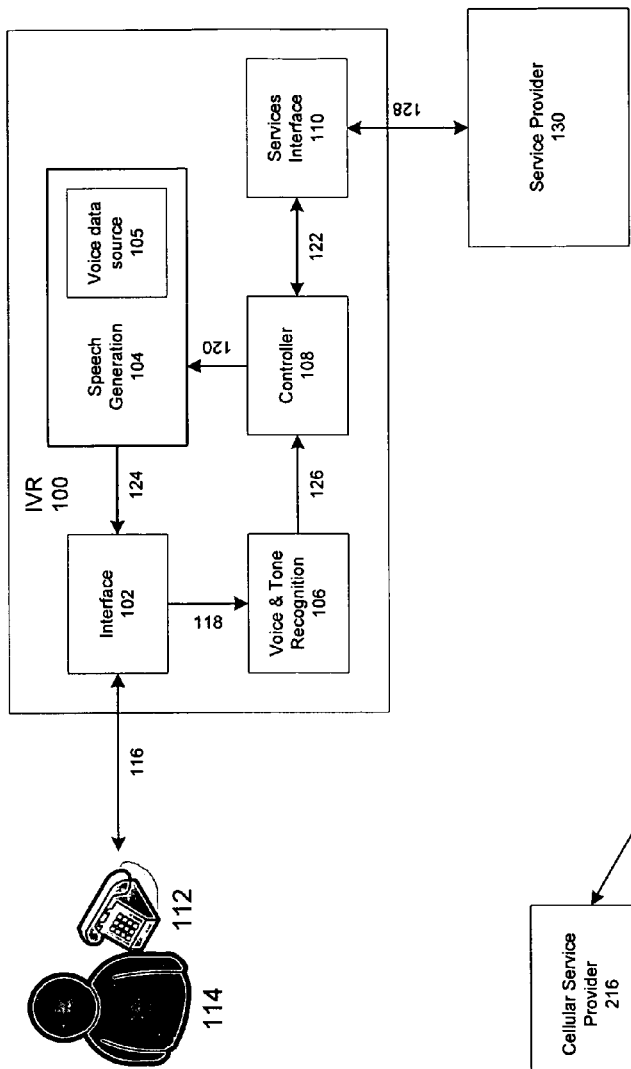
FIGS. 1-7 are a block diagrams.

As shown in FIG. 1, when a user 114 wishes to communicate with a service provider 130, she may use a telephone 112 to call an IVR 100 over a communication line 116. The communications line 116 could be a telephone network, a cellular network, a Voice Over Internet Protocol (VOIP) connection, or another method of voice communication. If the service provider were a bank, for example, the user could dial a number provided by the bank and be connected to an IVR operated by or on behalf of the bank.

Within the IVR 100, an interface 102 connected to the communications line 116 generates signals to communicate in both directions with the user 114. In one direction, the IVR can provide voice response or voice prompting to the user, for example. In the other direction the IVR can receive speech and touch tones from the user and the user's phone.

The audio (voice) signals to be transmitted to the user 114 are provided by a speech generation module 104 over line 124. The speech generation module 104 could synthesize voice from a data source 105 such as stored text or text provided to it, or could play back recorded real speech. The user's speech or touch-tones corresponding to her button presses on a telephone 112, are passed by the interface 102 to a voice & tone recognition module 106. The voice & tone recognition module 106 interprets the words spoken by the user 114 or the tones generated by the telephone 112. A controller 108 receives the user 114's input as interpreted by the voice and tone recognition module 106 over line 126 and may, in appropriate cases command the speech generation module 104 over line 120 to generate an appropriate output in cases where a spoken prompt or a spoken response is needed. The controller 108 is in communication with the service provider 130 through a services interface 110 and lines 122 and 128. By communication with the service provider 130 and based on its own programming, the controller 108 determines what action (if any) to take in response to the user 114's input and what output (if any) to instruct the speech generation module 104 to produce. The response could include hanging up, asking for more information, or providing information from the service provider to the user by voice response, for example. The telephone 112 could be a land-line telephone, a mobile phone, a mobile computer, or some other device acting as a telecommunications device.

The lines 116, 118, 120, 122, 124, 126, and 128 could each be an analog or digital communication link. Any two or more of the interface 102, the speech generation module 104, the voice & tone recognition module 106, the controller 108, and the services interface 110 could be partially or fully integrated into a single unit, for example, a computer, eliminating the need for one or more of the dedicated lines 118, 120, 122, 124, or 126. Any of one or more of the interface 102, the speech generation module 104, the voice & tone recognition module 106, the controller 108, and the services interface 110 could be implemented in software or in hardware or a combination of the two, and may be located at a single site or distributed in multiple locations. The IVR 100 or any of its components may be operated by the service provider 130 and located at its facilities or may be operated by an independent operator or located separately from the service provider 130's facilities. The service provider 130 could be anything that receives or provides information or services, from a single computer to a multinational corporation.

Figure 2:
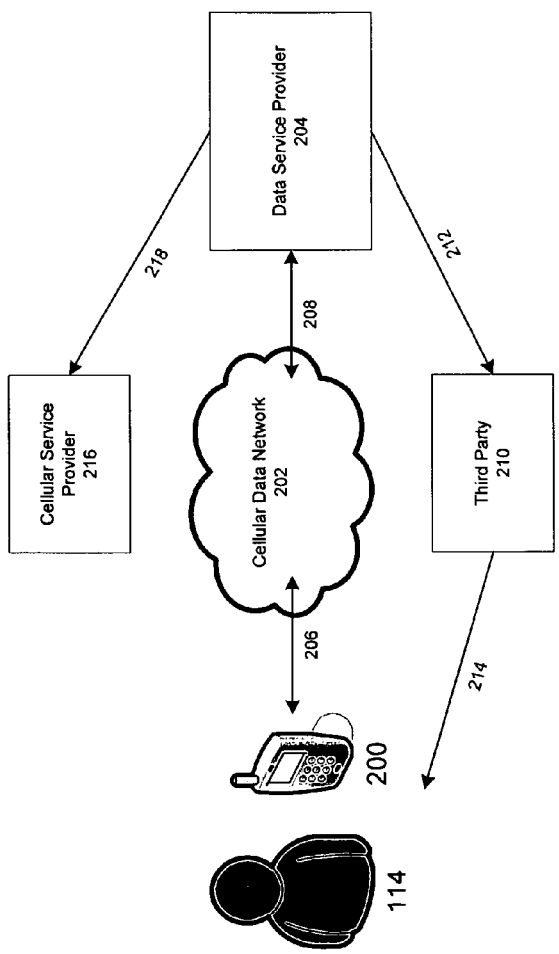

Users of cellular telephones or other portable devices, such as PDAs, increasingly use cellular data networks to communicate with service providers, either directly for a service offered by their network providers, or through the Internet in other cases. As illustrated in FIG. 2, the user 114 uses a device 200 to access a cellular data network 202 over a wireless link 206, and through the network to access a data service provider 204. The data service provider 204 is connected to the cellular data network 202 though a link 208. The link 208 could be a wireless link directly to the cellular data network 202, or it could be a wired or wireless link to an intermediate point, such as an operator (not shown) of the cellular data network 202. The data service provider 204 could be an interactive service that provides information, services, or products to the user 114, or an intermediary service that causes transmission of information, services or products to the user 114 from a third party 210 through links 212 and 214. The device 200 could be a mobile phone, a mobile computer, or some other device capable of connecting to cellular data network 202.

One example is a ringtone service, in which the user 114 sends a text message to the data service provider 204 indicating her preferences related to ringtones, and the data service provider 204 then transmits a ringtone to the user 114 which she can then use on her cellular phone. The ringtone is stored in a memory 804 on the device 200, as shown in FIG. 8. The user 114 might include payment information in her initial message, or the data service provider might bill the user 114 through her service provider 216, with which it communicates over a link 218.

Interaction by the user with the data service provider 204 can be made simple, quick, cheap, and pleasant, especially in the context of a bandwidth-limited channel, by enabling the interaction with the IVR (or other user interfacing system) to occur over a telephone system 300 (FIG. 3) using lines 302 and 304. The line 302 is a communications link provided by the user 114's telephone service provider 310, which could be wireless if the device 200 is a cell phone, or wired if the device 200 is a land-line phone. The link 304 is whatever link the IVR 100 has to the telephone system 300, such as a traditional land-line telephone service. The IVR could be operated by the telephone service provider in some cases. The telephone system 300 could be the public telephone system or it could be a private telephone system, or a combination. Any of the links 302 and 304 or the telephone system 300 could be replaced in this example by another voice-based communications system such as VOIP.

The IVR 100 in turn communicates with the data service provider 204 over a link 306. The IVR 100 converts voice or tone input provided to it by the user 114 into data input expected by the data service provider 204. Similarly, it converts any response from the data service provider 204 into speech which it communicates back to the user 114. To use this system, the user 114 need only enter a standard telephone number into the device 200 to reach the IVR 100 and then simply speak to and listen to the IVR 100 or press numbers on the device 200. Dialing, speaking, listening, and pressing numbers are actions that any user of a phone has already learned and knows how to use intuitively.

Figure 3:
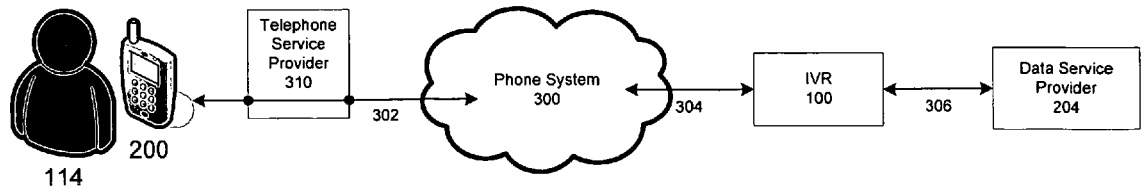
Figure 4:
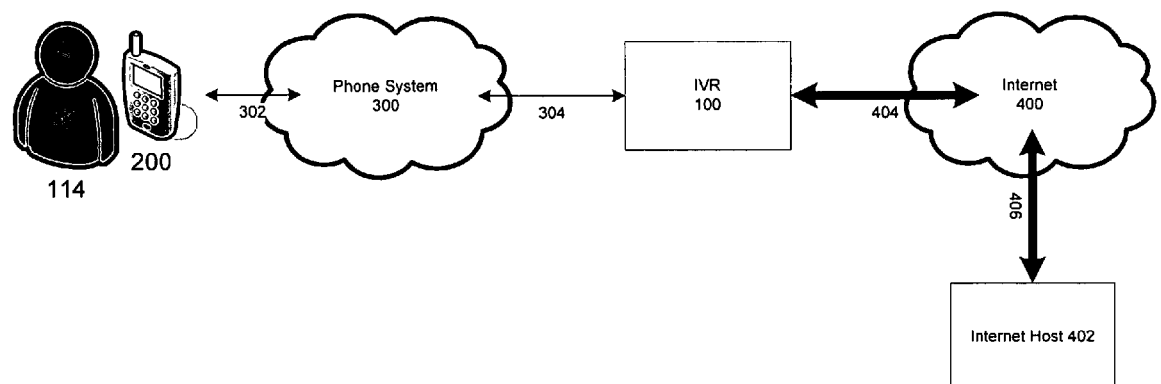

In some implementations, illustrated in FIG. 4, the user's 114 interaction with an Internet-based server can be made faster, easier, and more intuitive by connecting the IVR 100 through a high-bandwidth link 404 to the Internet 400. Then the IVR conducts high-speed interaction with, for example, the World Wide Web instead of the user using a lower bandwidth link and a browser that is constrained by a small screen and a numeric keypad of a typical hand-held device. The user 114 uses the device 200 to communicate with the IVR 100 over the links 302 and 304 and the phone system 300, or another voice-based communications system such as VOIP, as in FIG. 3. Because the high-bandwidth link 404 provides a fast connection to the Internet 400, the IVR 100 can convert the user 114's input into Internet communications, transmit them to a host 402 connected to the Internet 400 by a link 406, and convert any response to voice and read it back to the user 114 more quickly than the cellular data network 202 of FIG. 2 could have transmitted the user 114's input and returned the 402's response in digital form.

Figure 5:
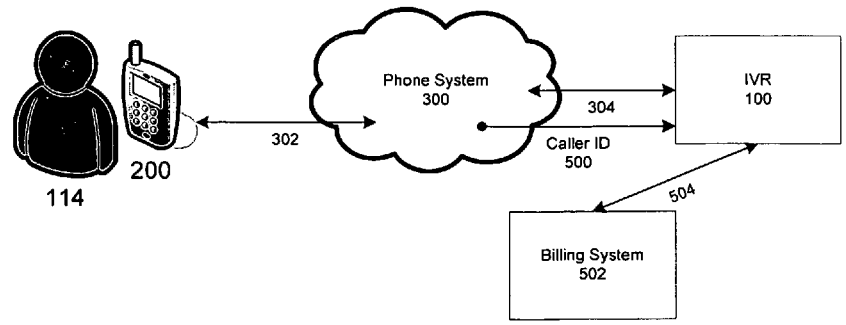

In the examples of FIGS. 3 and 4, the service or host with which the IVR 100 is communicating on behalf of the user 114 may require identification of the user 114, or the IVR 100 may require such identification itself. As illustrated in FIG. 5, instead of requiring or trusting the user 114 to provide such identification, the identification can be provided by the phone system 300 via a caller ID message 500. The identification could be a subscriber ID or a handle, for example, if the user is using a telephone system that does not support caller ID. The IVR 100 could communicate that identification to any service provider or host with which it communicates. This could be done in a pre-arranged fashion, if a service provider, e.g., the data service provider 204 in FIG. 3, is equipped to receive caller ID information. In some implementations, it could be done on the fly, for example, by automatically providing identification information that is requested by an Internet host, e.g., Internet host 402 in FIG. 4, skipping the step of reading to the user 114 the request for identification and getting a response from the user 114. At some level of the transaction, in the IVR 100, at the service provider 204, or somewhere else in the process, the identification provided by the caller ID message 500 is processed and can be used to look up or create an account with integration into the user 114's service provider's billing system or a credit card billing system 502, which may be in communication with the IVR 100 over a link 504. The information provided in the caller ID message may also be used to determine that the caller is using a cellular phone.

Figure 6:
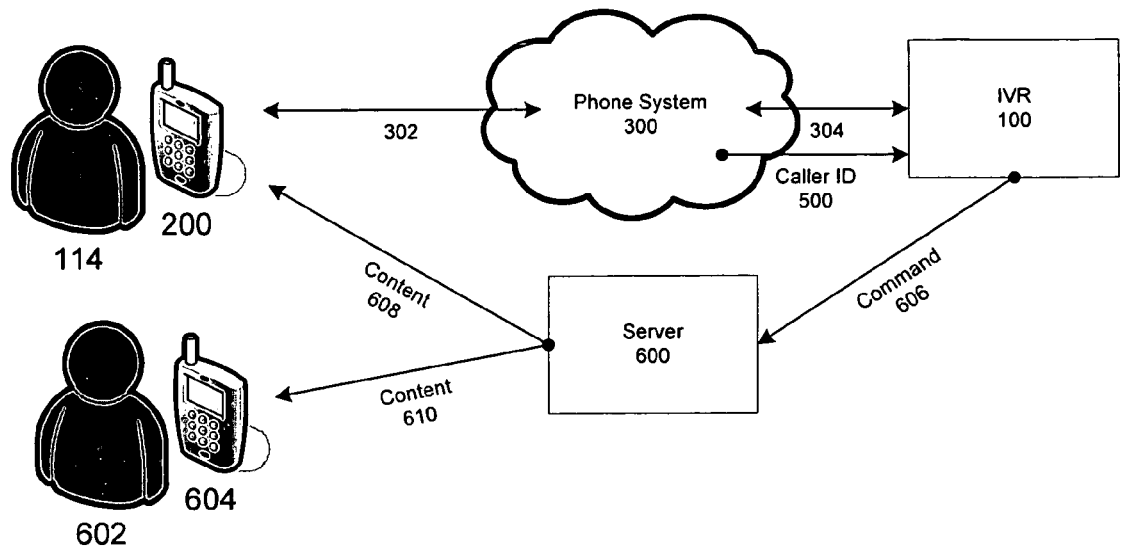

In some implementations, as shown in FIG. 6, the IVR 100 may direct a server 600 to directly provide something to the user 114. The user 114 uses the device 200 to communicate with the IVR 100 through the phone system 300, as before. In response to the user 114's input, the IVR 100 sends a command 606 to the server 600. The server 600 sends, for example, some content 608 to the user 114. The content is then displayed on a visual display 802 or stored in a storage medium 804 or 806, as shown in FIG. 8. The server 600 might also be instructed to send some content 610 to another user 602 using a 15 device 604. For example, the user 114 may request that a ringtone be sent either to himself or to the user 602 by providing the user 602's phone number or other identification. The IVR relays that request to the server 600, and the ringtone is sent as the content 608 or 610 to the device 200 or 604, respectively, and stored in the storage medium 804 or 806. Content that is suitable for visual display, such as a wallpaper or a game, may be displayed on the visual display 802 instead of or in addition to being stored in the storage medium 804 or 806. The content 608 and 610 may be communicated using a cellular data network as in FIG. 2, or, if suitable, could be communicated via the phone system 300 or any other means of transmitting content to a device. The content may be transmitted once, or may be transmitted on a recurring basis, for example a ringtone of the week service. Any charges for the content may be based on the caller ID message 500 or on information provided by the user 114 at the time he requests the content. Such a service can be advantageous when the results of a request must be sent as data, but the request for that data can more easily be communicated over the phone. The visual display 802 may be a text display, such as for displaying text messages, or a graphics display capable of displaying videos, wallpapers, video games, or other visual content. The storage medium 804 may be an internal memory built into the device or it may be a removable memory, for example a memory card. The network storage medium 806 may be a storage medium not integrated with the phone but accessible by it through connection 808, which may be a short-range wireless network, a cellular data network, a data cable, infrared communication, or some other means. Storage media 804 and 806 may be any of a volatile memory, a flash memory, a hard disk, or any other form of memory used for storage of data.

Rather than sending the content directly to the user, the IVR 100 may direct the server 600 to send a message to the phone that contains a link to the desired service or content. When the user receives the message and opens the link, he is connected to the service or content through the phone's data capabilities as if he had navigated to that point using the phone's data capabilities, for example a mobile web browser, in the normal manner. Such a service can be used to simplify the process of accessing services through the phone's data capabilities, for example by simplifying the information that must be provided to a user for him to find a particular services. Instead of instructing the user to navigate through a particular series of mobile web pages, the user can be given a phone number that, when called, will cause the IVR, through a server, to send the user a link directly to the final page of the series.

Figure 7:
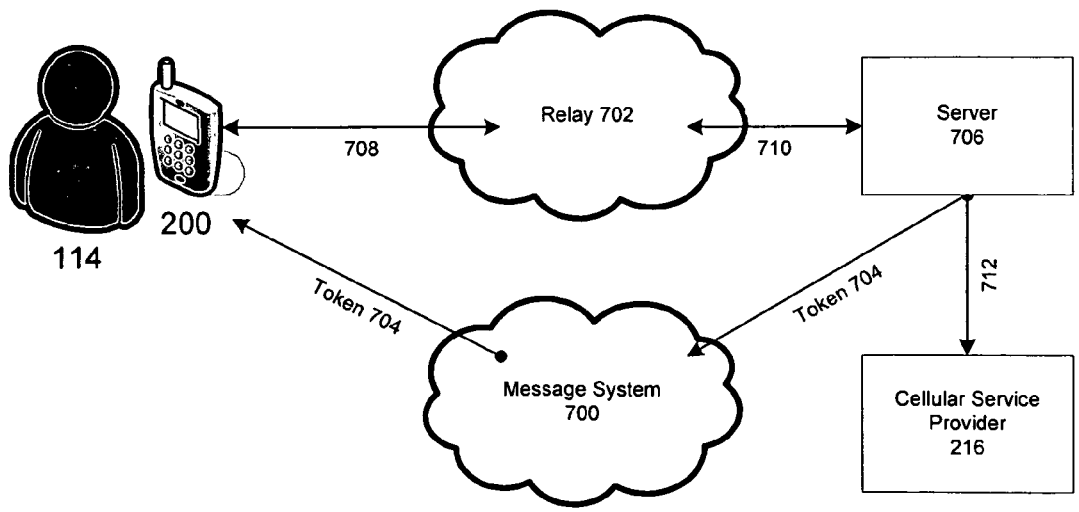

In some implementations, a server or service provider with which a user is in communication needs to verify the identification provided by the user. As shown in FIG. 7, the user 114 is in communication with a server 706 through a relay 702 over links 708 and 710. The relay 702 and links 708 and 710 could be one of the examples of FIGS. 2, 3, 4, or 6, or another method of communicating between the device 200 and the server 706. The server 706 could be a data service provider 204 (figures. 2, 3), an internet host 402 (FIG. 4), a server 600 (FIG. 6), or another similar device or service. The user 114 provides his phone number or other appropriate address-type identification, e.g., an email address, to the server 706, and the server 706 sends a message containing a token 704 to the user 114 according to the phone number or other address-type identification provided. The message is transmitted through a message system 700, which could be a Short Message Service (SMS) operated by cellular telephone operators, or the Internet email system, or another method of transmitting digital messages to devices. When the device 200 receives the message containing the token 704, it relays the token 704 back to the server 706. If the token 704 is returned intact, i.e., the data comprising it has not been altered, or has been altered in an expected manner, the server 706 can be confident that the identification provided by the user 114 was in fact the user 114's identification. The token 704 could be data representing an encrypted value, such that the user 114 could not determine what value to send to the server 706 if he wished to forge the token 704, or it could be an Internet link that the user 114 must follow to demonstrate the authenticity of the information he provided.

In some implementations the features of FIGS. 6 and 7 are combined, as when a user wishes to purchase content using one phone, but have that content delivered to a different phone, as in FIG. 6, and further wishes to have the charges for the purchase collected through the receiving phone's account with a cellular service provider. The user 114 provides the phone number of the receiving phone 604 when purchasing content. Before the content 610 is transmitted, the IVR sends a message, e.g., an SMS message, through message system 700 to the designated receiving phone 604 asking the recipient 602 to take some action to confirm the purchase. When the recipient 602 takes that action, e.g., by replying to the SMS message, the IVR instructs the server 600 to transmit the content 610 and sends a message over a link 712 to the user 602's cellular service provider 216 instructing it to charge the user 602 for the content.

In one implementation, a user dials the number for a ringtone vendor on her cell phone and makes the call using her cellular service provider. The call is routed to an IVR operated on behalf of the vendor by an IVR operator. The IVR answers the call and plays recorded and synthesized speech to the user to tell her about the ringtones available from the vendor. In addition, when the call is connected, the cellular service provider transmits a caller ID message identifying the caller to the IVR. When the user hears the description of the ringtone she wishes to purchase, she speaks or presses buttons on her cell phone as instructed by the IVR. Before gathering billing information, the IVR may communicate with the vendor to inquire whether the user already has an account for which billing information is known. If not, the IVR connects to the cellular service provider to verify that the user can be charged for her purchase through the cellular service provider.

If the user cannot be charged through her cellular service provider, the IVR asks the user to enter credit card information. Upon receiving appropriate billing information, the IVR transmits the user's identification, purchase selection, and billing information to the vendor. The vendor then creates an account for the user, if she does not already have one, charges her for her purchase, and transmits the selected ringtone to the user's phone using MMS, WAP Push or other protocols for transmitting information to a cell phone. The ringtone is then stored in the phone's storage medium or in available network storage. Alternatively, the IVR could handle the account creation and billing, and simply inform the vendor what ringtone to send. The user receives the purchased ringtone on her cell phone.

In some implementations, after creating an account for the user and receiving the user's ringtone preferences from the IVR, the vendor may transmit new ringtones to the user periodically, charging her each time according to the billing information stored in the user's account.

Other implementations are within the scope of the following claims.

For example, instead of purchasing ringtones, a user could use the IVR to subscribe to a service that sends periodic text messages on some subject, e.g., daily bible verses or news headlines. A user could use the IVR to purchase games, wallpaper, or other downloadable digital media.

What is claimed is:

1. A method comprising
during a voice communication between a user's device and an interactive response system, enabling a user to engage in an interaction with the response system that is representative of an interaction between the user and a server connected to the Internet, and, on behalf of the user, conducting a separate interaction with the server based on the representative interaction, and receiving at a mobile device a communication from the server separate from the voice communication with the response system, at least part of the voice communication occurring while at least part of the separate interaction is being conducted.

2. The method of claim 1 in which the communication from the server comprises delivery of content to a storage medium accessible by a target mobile device.

3. The method of claim 1 in which the user's device comprises one or more of a mobile computer, or a device acting in the capacity of a telecommunications device.

4. The method of claim 2 in which the storage medium is one or more of an integrated component of the target mobile device, a removable component of the target mobile device, external to the target mobile device, and accessible by the target mobile device through a network.

5. The method of claim 2 in which the storage medium is one or more of a computer memory, a flash memory, a hard disk, and an optical disk.

6. The method of claim 2 in which the content is to be delivered by a supplier of content.

7. The method of claim 6 in which the supplier of content is independent of the interactive response system.

8. The method of claim 2 also including
communicating with a service provider with respect to delivery of the content based on information specified by the user.

9. The method of claim 1 also including
using information provided in connection with the voice communication to manage a user account associated with the user.

10. The method of claim 2 also including
automatically obtaining information during the voice communication that identifies the user, and
using the information identifying the user to instruct a third party to bill the user for the content.

11. The method of claim 10 in which the third party provides telephone services to the user.

12. The method of claim 2 in which the content comprises at least one of a ringtone, a text message, a wallpaper, a ring-back tone, a video clip, a web page, an application, and a link to information that can be accessed by the target mobile device.

13. The method of claim 8 in which the service provider is independent of the interactive response system.

14. The method of claim 8 in which the information about delivery of content includes an identification of the content.

15. The method of claim 1 in which the user communicates billing information during the interaction with the response system.

16. The method of claim 1 in which the voice communication is conducted on a bandwidth-limited channel and the separate interaction is conducted on a higher-bandwidth channel.

17. The method of claim 1 in which at least part of the voice communication occurring while at least part of the separate interaction is being conducted comprises at least part of the voice communication and part of the separate interaction with the server occurring at the same time.

18. The method of claim 1 in which at least part of the voice communication and part of the separate interaction with the server occur at different times.

19. The method of claim 1 in which the user's device comprises a mobile phone.

20. The method of claim 1 in which the interactive response system comprises an IVR system.

21. The method of claim 1 in which the server is independent of the interactive response system.

22. The method of claim 1 also including
automatically obtaining information during the voice communication that identifies the user, and
using the information identifying the user to provide information identifying the user to the server.

23. The method of claim 1 also including
automatically obtaining information during the voice communication that identifies a target device for content delivery, and
using the information identifying the target device for content delivery to facilitate the delivery of content.

24. The method of claim 23 in which the information that identifies the target device for content delivery comprises at least one or more of a caller ID, a subscriber ID, or a handle.

25. The method of claim 23 also including managing an account of the user based on the automatically obtained information and the information specified by the user.

26. The method of claim 1 in which the mobile device receiving the communication from the server is the user's device.

27. The method of claim 1 in which the mobile device receiving the communication from the server is a mobile device other than the user's device.

28. The method of claim 23 in which the information identifying the target device for content delivery also identifies the user.

29. The method of claim 1 also including
automatically obtaining information during the voice communication that identifies the user, and
using the information identifying the user to facilitate delivery of content.

30. The method of claim 2 in which the content comprises a ringtone.

31. The method of claim 2 in which the content comprises a text message.

32. The method of claim 2 in which the content comprises a game.

33. The method of claim 2 in which the content comprises a wallpaper.

34. The method of claim 2 in which the content comprises a ring-back tone.

35. The method of claim 2 in which the content comprises a video clip.

36. The method of claim 2 in which the content comprises a web page.

37. The method of claim 2 in which the content comprises an application.

38. The method of claim 2 in which the content comprises a link to information that can be accessed by the target mobile device.

39. The method of claim 2 in which the content comprises downloadable digital media.

40. The method of claim 23 in which the information that identifies the target device comprises an address associated with the target device.

41. The method of claim 29 in which the information that identifies the user comprises an address associated with the user.

42. The method of claim 41 in which the address associated with the user is an e-mail address.

43. The method of claim 41 in which the address associated with the user is a telephone number.

44. The method of claim 29 in which the information that identifies the user comprises an address associated with the user's device.

45. The method of claim 1 further comprising using information specified by the user during the interaction with the response system to facilitate the delivery of content.

46. The method of claim 1 in which the voice communication comprises a telephone call.

47. The method of claim 1 in which the user's device comprises a telephone.

48. The method of claim 1 in which the separate interaction with the server is conducted through the Internet.

49. The method of claim 1 in which the communication from the server comprises delivery of content to a visual display of a target mobile device.

50. The method of claim 49 in which the content is to be delivered by a supplier of content.

51. The method of claim 50 in which the supplier of content is independent of the interactive response system.

52. The method of claim 49 also including
communicating with a service provider with respect to delivery of the content based on information specified by the user.

53. The method of claim 52 in which the service provider is independent of the interactive response system.

54. The method of claim 52 in which the information about delivery of content includes an identification of the content.

55. The method of claim 49 also including
automatically obtaining information during the voice communication that identifies the user, and
using the information identifying the user to instruct a third party to bill the user for the content.

56. The method of claim 55 in which the third party provides telephone services to the user.

57. The method of claim 49 in which the content comprises at least one of a ringtone, a text message, a wallpaper, a ring-back tone, a video clip, a web page, an application, and a link to information that can be accessed by the mobile device.

58. The method of claim 49 in which the content comprises a ringtone.

59. The method of claim 49 in which the content comprises a text message.

60. The method of claim 49 in which the content comprises a game.

61. The method of claim 49 in which the content comprises a wallpaper.

62. The method of claim 49 in which the content comprises a ring-back tone.

63. The method of claim 49 in which the content comprises a video clip.

64. The method of claim 49 in which the content comprises a web page.

65. The method of claim 49 in which the content comprises an application.

66. The method of claim 49 in which the content comprises a link to information that can be accessed by the target mobile device.

67. The method of claim 49 in which the content comprises downloadable digital media.

68. An interactive response system comprising
a communications interface configured to engage in a voice communication with a user's device, the voice communication including an interaction representative of an interaction between the user and a server connected to the Internet, and a services interface configured to conduct, on behalf of the user, a separate interaction with the server based on the representative interaction, at least part of the voice communication occurring while at least part of the separate interaction is being conducted, and enable the user to receive at a mobile device a communication from the server separate from the voice communication with the response system.

69. The interactive response system of claim 68 in which the voice communication comprises a telephone call.

70. The interactive response system of claim 68 in which the user's device comprises a telephone.

71. The interactive response system of claim 68 in which the services interface is configured to conduct the separate interaction with the server through the Internet.

72. The interactive response system of claim 68 in which
the communications interface is configured to automatically obtain information during the voice communication that identifies a target device for content delivery, and
the services interface is configured to use the information identifying the target device for content delivery to facilitate the delivery of content.

73. The interactive response system of claim 72 in which the information that identifies the target device for content delivery comprises at least one or more of a caller ID, a subscriber ID, or a handle.

74. The interactive response system of claim 72 in which the information that identifies the target device comprises an address associated with the target device.

75. The interactive response system of claim 68 in which
the communications interface is configured to automatically obtain information during the voice communication that identifies the user, and
the services interface is configured to use the information identifying the user to facilitate delivery of content.

76. The interactive response system of claim 75 in which the information that identifies the user comprises an address associated with the user.

77. The interactive response system of claim 76 in which the address associated with the user is an e-mail address.

78. The interactive response system of claim 76 in which the address associated with the user is a telephone number.

79. The interactive response system of claim 75 in which the information that identifies the user comprises an address associated with the user's device.

* * * * *